United States Patent [19]

Miles et al.

[11] Patent Number: 5,505,484
[45] Date of Patent: Apr. 9, 1996

[54] COLLAPSIBLE AIRBAG CANISTER

[75] Inventors: Jon E. Miles, Hiroshima, Japan; Scott L. Hansen; John T. Jensen, both of Ogden, Utah; Peter F. Martin, South Ogden, Utah

[73] Assignee: Morton International, Inc., Chicago, Ill.

[21] Appl. No.: 392,531

[22] Filed: Feb. 23, 1995

[51] Int. Cl.⁶ ................................. B60R 21/20
[52] U.S. Cl. ........................ 280/728.2; 280/732
[58] Field of Search ............... 280/728.2, 732, 280/730.1, 731, 728.1, 752

[56] References Cited

U.S. PATENT DOCUMENTS 3,778,085  12/1973  Lipkin ........................ 280/732
5,127,669   7/1992  Suran et al. .................. 280/732
5,145,207   9/1992  Bederka et al. .............. 280/728.2
5,209,519   5/1993  Shiga et al. .................. 280/728.2
5,263,739  11/1993  Webber et al. ............... 280/728.2
5,342,082   8/1994  Kriska et al. ................ 280/728.2

FOREIGN PATENT DOCUMENTS 5-270340  10/1993  Japan ........................ 280/732

Primary Examiner—Margaret A. Focarino
Assistant Examiner—Peter C. English
Attorney, Agent, or Firm—George W. Rauchfuss, Jr.; Gerald K. White

[57] ABSTRACT

A reaction canister for a passenger side airbag module is designed with a collapsible sidewall to prevent impact injuries occurring through the instrument panel. The sidewall is connected to the reaction canister base by means of a friction fit hook assembly. The assembly disengages upon impact with the mouth of the canister.

16 Claims, 1 Drawing Sheet

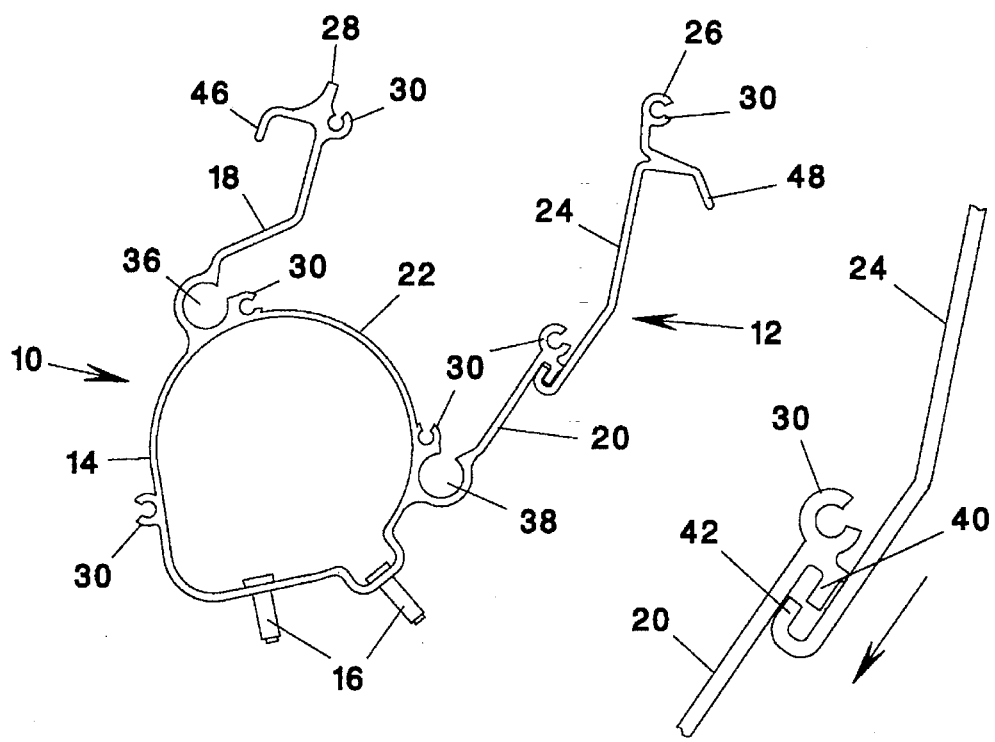
FIG. 1
FIG. 2
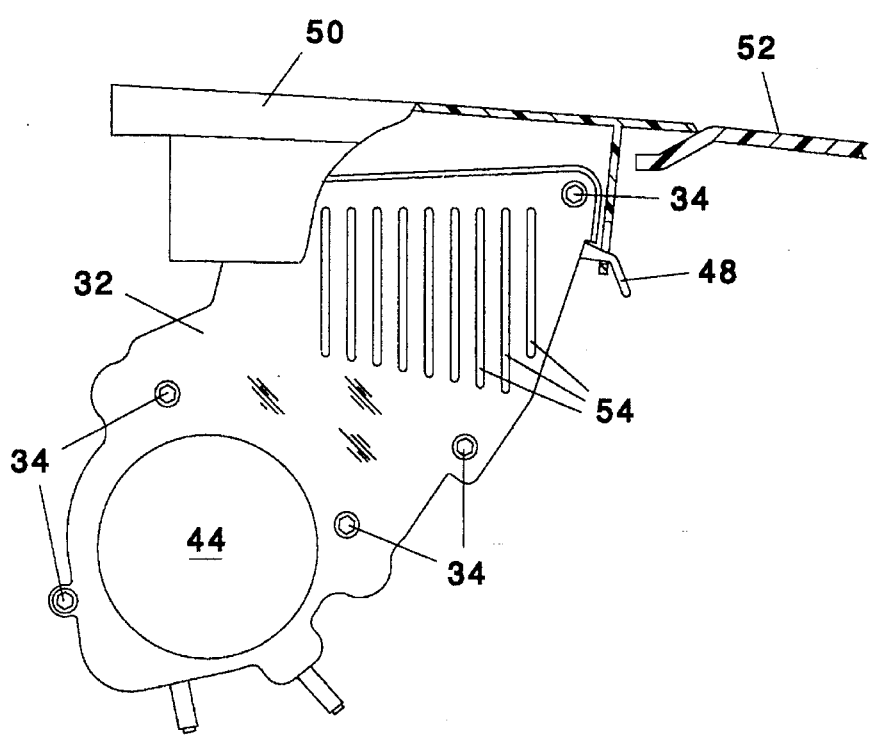
FIG. 3

COLLAPSIBLE AIRBAG CANISTER

TECHNICAL FIELD

This invention relates to motor vehicle airbag installations. More particularly, it relates to a collapsible reaction canister for a passenger-side airbag module.

BACKGROUND TO THE INVENTION

Passenger-side airbag modules are customarily installed behind the instrument panels of motor vehicles. A typical installation includes a reaction canister in the form of an open trough within which is stored the folded airbag. The mouth of the trough is closed by a plastic cover which forms a portion of the instrument panel. The passenger-side module includes an inflator which carries a gas generant. In response to a crash sensor, an electrical signal activates the generant to produce gas which rapidly inflates the airbag. The plastic cover bursts or is otherwise opened to release the airbag into the passenger compartment.

One problem with installations of this type arises from the fact that the open mouth of the airbag reaction canister is in close proximity to the relatively soft cover. As a result, upon the occurrence of a relatively mild accident of a severity lower than that required to activate the airbag, a potential hazard is presented. A passenger's head, for example, may be injured upon striking the relatively soft plastic cover overlying the rigid edges of the reaction canister. As a result, there are federal safety standards which must be met to avoid this problem. Accordingly, it is a primary object of the present invention to provide a passenger-side airbag module wherein the reaction canister may be firmly mounted to the structure of the vehicle while presenting a collapsible, and "soft", sidewall in the event of impact through the instrument panel or cover. Other objects, features and advantages will become apparent from the following description and appended claims.

DISCLOSURE OF INVENTION

At least one sidewall of the reaction canister is connected to the basewall of the canister through a friction fit slip joint. The slip joint is designed to disengage under impact loading. This results in collapse of the reaction canister sidewall.

BRIEF DESCRIPTION OF THE DRAWINGS

FIG. 1 is an end view of two extrusions forming the reaction canister of the invention;

FIG. 2 is an enlarged detail illustrating the action of the friction fit slip joint under impact; and FIG. 3 illustrates the reaction canister with its end plates as mounted in the instrument panel of a motor vehicle.

BEST MODE FOR CARRYING OUT THE INVENTION

The reaction canister of this invention may be made of plastic or of a metal such as steel or aluminum. If made of steel, it would presumably be stamped. If made of plastic or aluminum, it might very well be extruded. The reaction canister to be described is a two-part extruded aluminum canister to which end plates are secured.

FIG. 1 is an end view of a main body extrusion 10 and a mouth wall extrusion 12. The mouth wall extrusion is so named because it forms a portion of the mouth of the reaction canister as will be later apparent. The main body extrusion 10 comprises a substantially cylindrical inflator housing 14 which may be provided with mounting studs 16 for attachment to structural elements of the vehicle's body. Extending upwardly from one side of the inflator housing 14 is a sidewall 18. Spaced therefrom and extending upwardly from the opposite side of the inflator housing 14 is a second sidewall 20. Together the sidewalls 18, 20 form a trough having a floor 22 which is formed by the intermediate portion of the inflator housing 14. The floor 22 is provided with openings (not shown) which permit gas to flow from an inflator housed within the inflator housing 14 into a folded airbag contained within the trough formed by the sidewalls 18, 20. As will be apparent from FIG. 1, the sidewall 20, which may be defined as a basewall, is joined to a mouth wall 24. The upper edge 26 of the mouth wall 24 combines with the upper edge 28 of the sidewall 18 to form two edges of the rectangular mouth of the reaction canister. The extrusions forming the main body 10 and the mouth wall 12 include screw preparations 30 for the attachment of end plates, such as end plate 32 illustrated in FIG. 3, by means of screws 34. The main body extrusion 10 also includes channels 36, 38 for retaining the mouth of an airbag cushion in a manner well known in the art.

The particularly relevant feature of this invention is the relationship between the mouth wall member 24 and the basewall 20 of the reaction canister. As will be noted from FIGS. 1 and 2, these members are connected by interlocking hooks. One hook 40 is formed on the outer surface of the basewall member and the other hook 42 is carried by the mouth wall member 24. These hook members have a friction fit and may, but need not necessarily, extend the full length of the reaction canister sidewall. Under tension the hooks are securely engaged but, in the event of a downward impact on mouthwall member 24, the hooks disengage as illustrated by the arrow in FIG. 2. Of course, it will be readily apparent that the hook assembly may be placed anywhere along the height of the reaction canister sidewall, including its base adjacent the canister floor.

As previously indicated, the reaction canister of the invention is completed by an end plate at each end of the extrusions. Illustrated in FIG. 3 is the end plate 32 which receives the base 44 of a cylindrical inflator. The end plate (not shown) at the other end of the canister would normally receive the inflator mounting stud in a manner well known to the art. It will thus be seen that the main body extrusion 10 and the mouth wall extrusion 12, together with the end plates, form a complete reaction canister having an open mouth enclosing a folded airbag. Projections 46, 48 engage portions of a plastic cover 50 which covers an opening in the vehicle instrument panel 52 when the reaction canister is installed.

It will now be apparent that the base member 20 and mouth member 24 forming the collapsible sidewall are maintained in their interlocking relationship by the presence of the end plates. Accordingly, the end plates might normally be expected to prevent the disengagement of the two wall portions in the event of a downward impact upon edge 26 through the cover 50. However, one of the features of this invention permits the end plates to be "tuned" or weakened by a predetermined amount to permit wall collapse under a predetermined impact force. In the embodiment illustrated in FIG. 3, this tuning is achieved by providing a plurality of slots 54 in the end plate. However, other methods may be employed, such as variations in the thickness of the end plate material, the use of ribs or, by similar strategies.

One of the advantages of a reaction canister constructed in accordance with this invention is that it permits deformation in one direction, such as illustrated in FIG. 2, without weakening in other directions. In fact, the interengaging hooks shown in FIG. 1 actually strengthen the combined sidewall against deformation in other directions. The resulting increased strength in the horizontal direction (as viewed in FIG. 1) serves to prevent or reduce "bell mouthing" which can result in damage to an instrument panel.

As a result of this invention, there is provided a reaction canister which may be mounted behind, and in close proximity to, a relatively soft plastic instrument panel without posing a threat of serious injury upon impact by a passenger. Furthermore, the impact resistance may be "fine tuned" by the structure of the end plates.

It is believed that the many advantages of this invention will now be apparent to those skilled in the art. It will also be apparent that many variations may be made in this invention without departing from its spirit and scope. Accordingly, the foregoing description is to be construed as illustrative only, rather than limiting. This invention is limited only by the scope of the following claims.

We claim:

1. In a passenger side airbag module reaction canister for mounting behind and in close proximity to an instrument panel of a motor vehicle and of the type having spaced first and second sidewalls interconnected by a floor and joined at their ends by first and second end plates to form a trough with an open mouth therebetween for enclosing a folded airbag, the improvement wherein said first sidewall comprises:

a basewall member extending from said floor in the direction of said mouth;

a first hook carried by and unitary with said basewall member;

a mouth wall member extending from said mouth; and a second hook carried by and unitary with said mouth wall member, said second hook engaging said first hook but disengageable therefrom under the influence of a compressive force acting from the direction of said mouth toward said floor.

2. The improvement of claim 1 wherein at least one of said end plates is structured to modify the force required to disengage said first and second hooks.

3. The improvement of claim 2 wherein said structural modification comprises perforations.

4. The improvement of claim 3 wherein said perforations are slots.

5. In a passenger side airbag module reaction canister for mounting behind and in close proximity to an instrument panel of a motor vehicle and of the type having spaced first and second sidewalls interconnected by a floor and joined at their ends by first and second end plates to form a trough with an open mouth therebetween for enclosing a folded airbag, the improvement wherein said first sidewall comprises:

first and second wall members each having a hook means unitary therewith and in which said hook means engage each other but are disengageable from each other under the influence of a compressive force acting on said first sidewall from the direction of said mouth toward said floor.

6. The improvement of claim 5 wherein said hook means extends substantially the length of said first sidewall.

7. The improvement of claim 5 wherein said hook means is positioned intermediate said floor and the open mouth of said trough.

8. The improvement of claim 5 wherein at least one of said end plates is structured to modify the force required to disengage said hook means.

9. The improvement of claim 8 wherein said structural modification comprises perforations.

10. The improvement of claim 9 wherein said perforations are slots.

11. The improvement of claim 5 wherein said hook means are adjacent the floor of the canister.

12. In a passenger side airbag module reaction canister of the type having spaced first and second sidewalls interconnected by a floor and joined at their ends by first and second end plates to form a trough with an open mouth therebetween for enclosing a folded airbag, the improvement wherein said first sidewall comprises:

engageable hook means which are disengageable under the influence of a compressive force acting on said first sidewall from the direction of said mouth toward said floor, and wherein at least one of said end plates is structured to modify the force required to disengage said hook means.

13. The improvement of claim 12 wherein said structural modification comprises perforations.

14. The improvement of claim 13 wherein said perforations are slots.

15. The improvement of claim 12 wherein said hook means extends substantially the length of said first sidewall.

16. The improvement of claim 15 wherein said hook means is positioned intermediate said floor and the open mouth of said trough.

* * * * *

UNITED STATES PATENT AND TRADEMARK OFFICE
CERTIFICATE OF CORRECTION

PATENT NO. : 5,505,484
DATED : 9 April 1996
INVENTOR(S) : Jon E. Miles et al.

It is certified that error appears in the above-indentified patent and that said Letters Patent is hereby corrected as shown below:

At column 2, line 29, "and the other" should be
--20 and the other--.

Signed and Sealed this

Thirteenth Day of August, 1996

Attest:

BRUCE LEHMAN

Attesting Officer        Commissioner of Patents and Trademarks